UNITED STATES PATENT OFFICE.

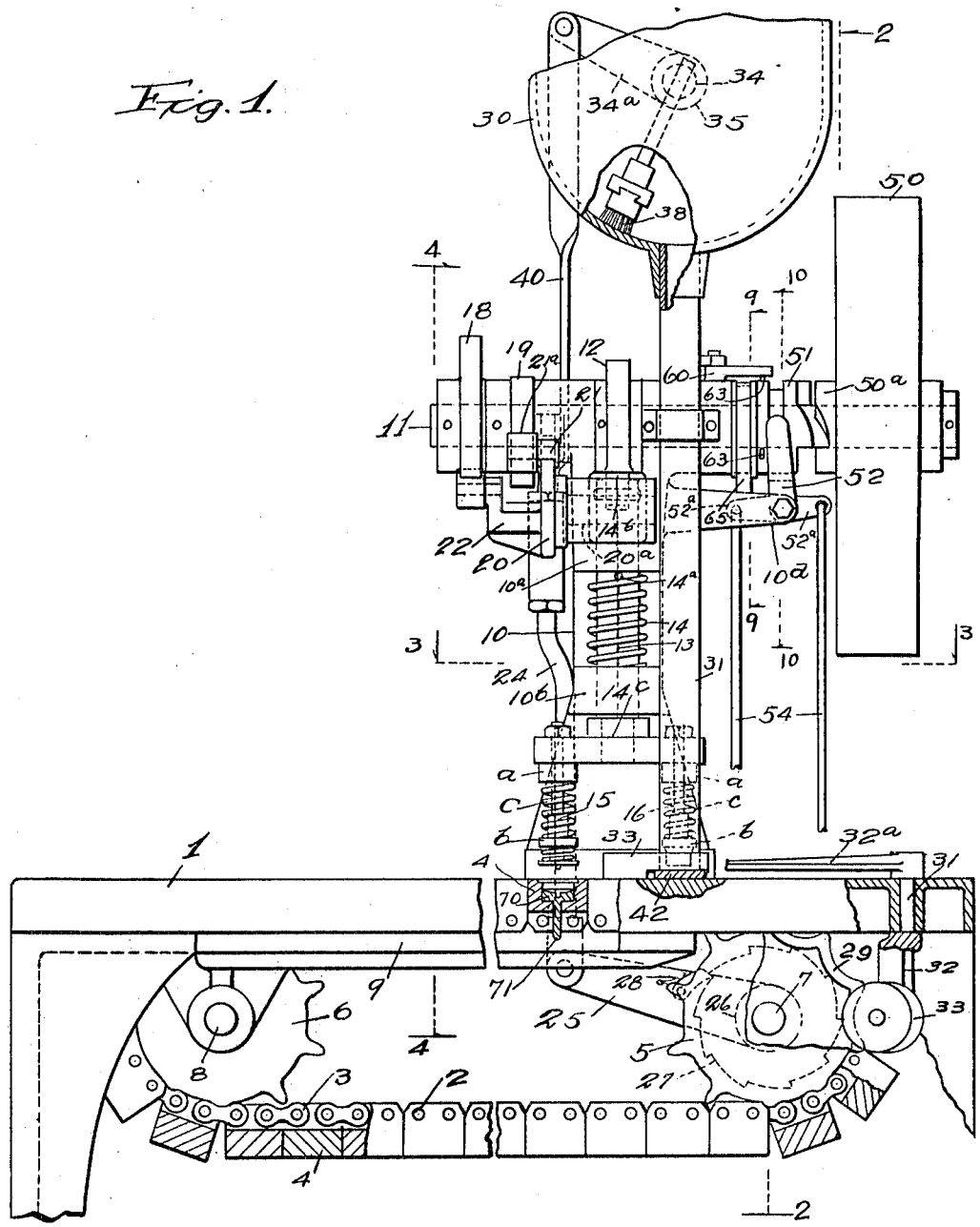

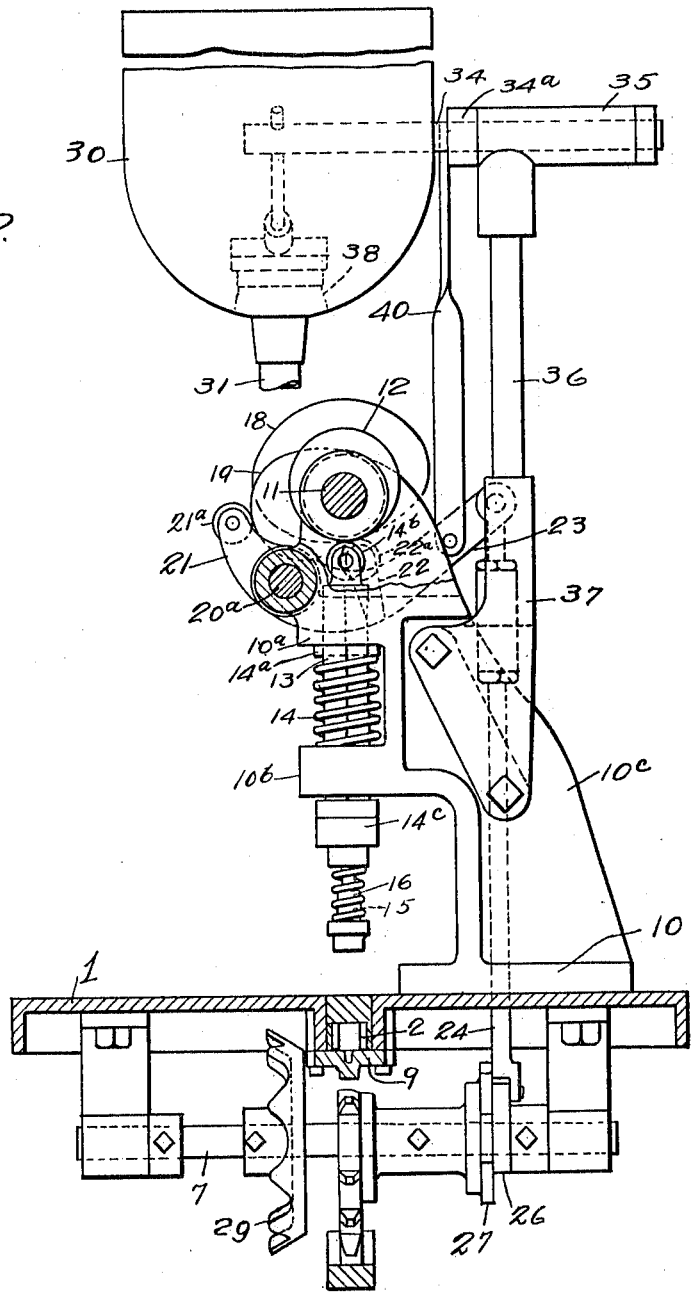

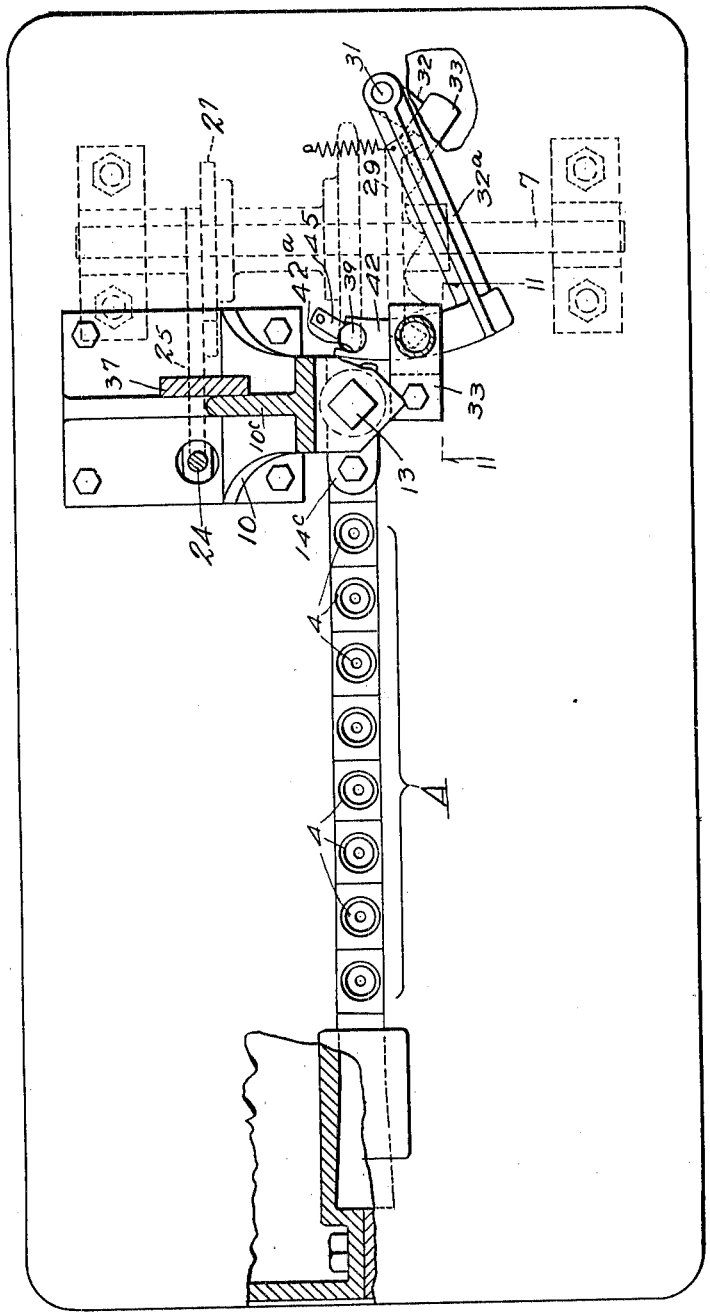

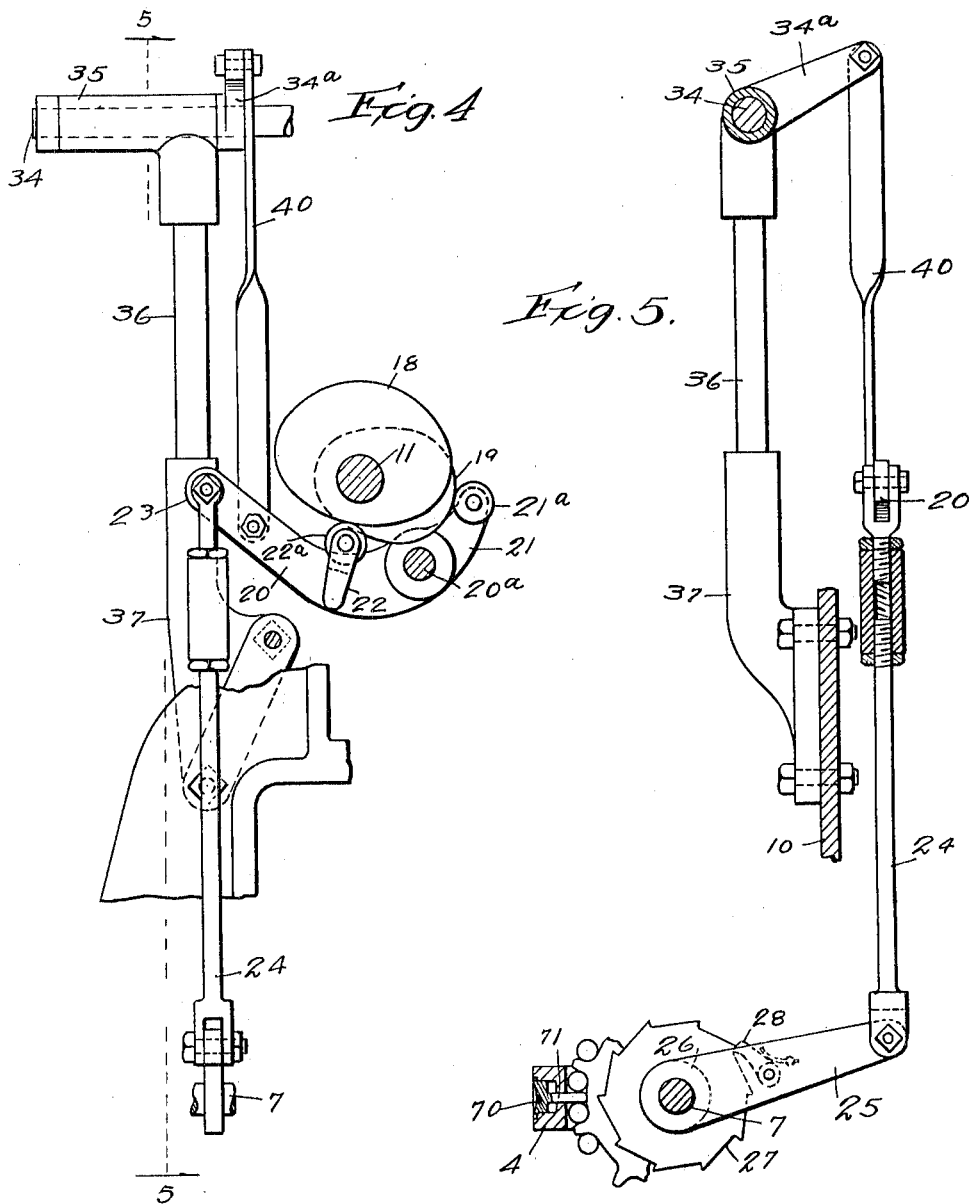

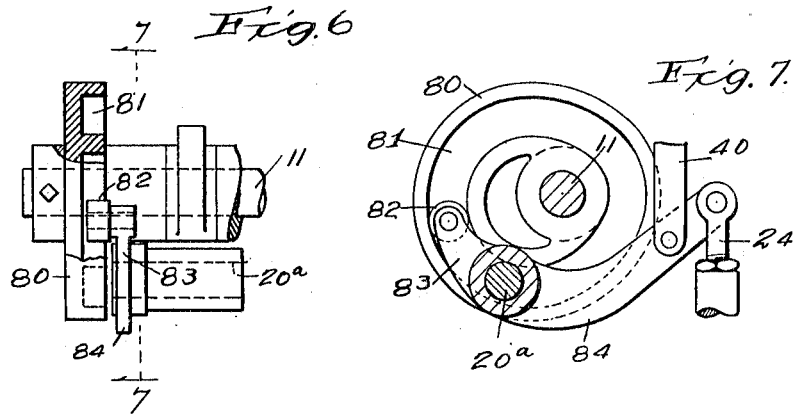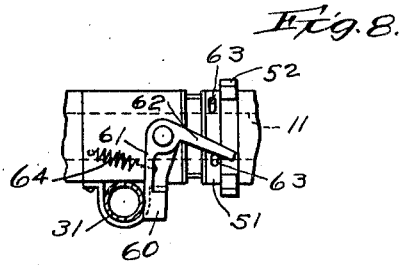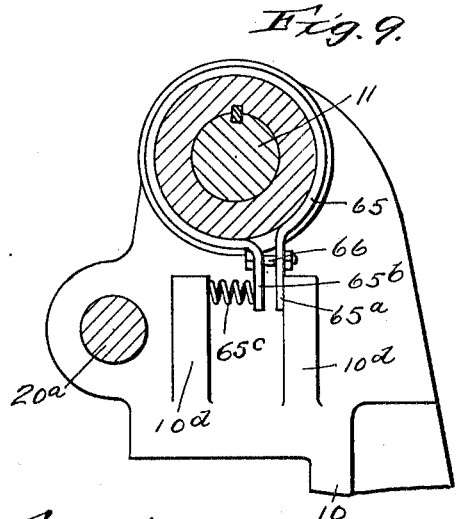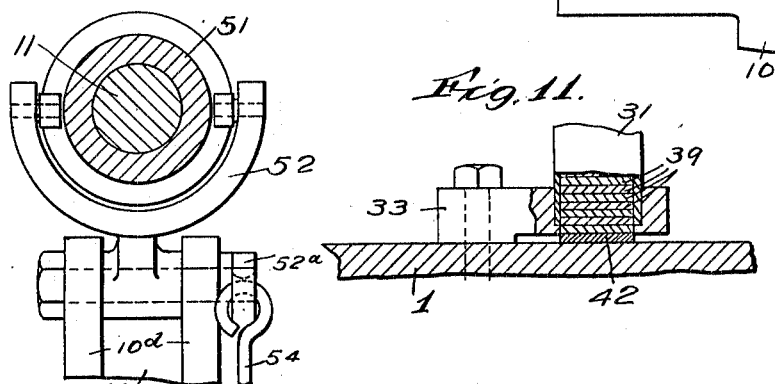

JULIUS G. BREITENSTEIN, OF CHICAGO, ILLINOIS.

PRESS.

1,105,749.  Specification of Letters Patent.  Patented Aug. 4, 1914.

Application filed May 5, 1913. Serial No. 765,424.

*To all whom it may concern:*

Be it known that I, JULIUS G. BREITENSTEIN, a citizen of the United States, residing at Chicago, in the county of Cook and State of Illinois, have invented new and useful Improvements in Presses, of which the following is a specification, reference being had to the accompanying drawings, forming a part thereof.

The purpose of this invention is to provide an improved mechanism of the general class of a press in which the work is operated upon between a holding device and an advanced and retracted working member.

It consists in the elements and features of construction shown and described, as indicated in the claims.

In the drawings: Figure 1 is a front elevation with a portion of the frame broken away to disclose interior parts. Fig. 2 is a section at the line, 2—2, on Fig. 1. Fig. 3 is a horizontal section at the line, 3—3, on Fig. 1. Fig. 4 is a section at the line, 4—4, on Fig. 1. Fig. 5 is a detail section at the line, 5—5, on Fig. 4. Fig. 6 is a detail section transverse to the main shaft at the same point thereon as Fig. 2, showing a modification of the cam structure for actuating the endless chain of work holders. Fig. 7 is a view of the same looking in the direction of the arrow, 7, on Fig. 6. Fig. 8 is a detail plan view of a tapping device for facilitating the piling of disks in for delivery to the work-holders. Fig. 9 is a detail section at the line 9—9, on Fig. 1. Fig. 10 is a detail section at the line, 10—10, on Fig. 1. Fig. 11 is a detail section at the line, 11—11, on Fig. 3.

The machine shown in the drawings is especially designed, as to details, for presses for such purposes as assembling button backs and making covered buttons, and some details of the structure have their entire utility consisting in their adaptation to this specific use; but the invention is intended for broader application and will be described with relation to its broader uses.

As illustrated, the machine comprises a bed-frame, 1, in which there is mounted an endless chain, 2, composed of links, 3, each of which carries a work-holder, 4, which, for the specific purpose for which the machine is designed,—making buttons and assembling button backs and for many other purposes,—may be of the nature of a die, as seen in section axial with respect to one of these parts in Fig. 1. This endless chain, 1, is mounted on carrying sprocket wheels, 5 and 6, whose shafts, 7 and 8, respectively, are journaled in the frame, 1. The upper ply of the work-carrier chain travels above a rigid support, 9, upon which the work-holders rest in moving through this part of their endless path. Said rigid support, 9, is suspended rigidly from the upper plate of the frame, as seen in Fig. 2. Said upper plate has its upper surface flush with the top of the dies.

Upon the bed, 1, there is erected a standard, 10, in which there is journaled a continuously rotating shaft, 11, having a cam, 12, which operates upon the upper end of the plunger, 13, for reciprocating the plunger in the standard, a spring, 14, being provided between the bearings, $10^a$, $10^b$, and operating against a stop collar, $14^a$, to retract the plunger upward, the cam operating to drive it downward. The anti-friction roll, $14^b$, at the upper end of the plunger, directly receives the action and relieves the friction of the cam. Upon the lower end of the plunger below the lower bearing, $10^b$, it carries a cross-head, $14^c$, extending in the direction of the travel of the endless work-holder belt, and having at its opposite ends, respectively, working members, 15 and 16, for coöperating with the work-holder dies, 4, of the endless work-holder belt. For the specific purpose for which the machine shown in the drawings is designed, these working members, 15 and 16, are both in the nature of two-part dies, the particular character of the dies in this respect is not essential, being varied according to the particular character of the button which is to be made, and need not be particularly described, beyond calling attention to the fact that each of them comprises a main member, $a$, which is positively reciprocated, and a member, $b$, which is mounted for yielding with respect to the main member, back or away from the opposed die a spring, $c$, being provided to yieldingly resist the yielding movement of the member, $b$.

It will be understood that the work-holder dies, 4, and the working members, 15 and 16, must be properly registered with each other at the time of the down-thrust of the said working members, and for that purpose the means for actuating the endless work-holder belt is such as to give it a step-by-step movement with intervening halts, during which halts the plunger, 14, is reciprocated to cause the working members, 15 and 16, to perform their office upon the work brought into line with them by the work-holder dies. For causing the step-by-step movement of the endless work-holder belt to occur in proper time relation to the reciprocation of the plunger, the operation of the two parts of the mechanism is produced from the same shaft, 11. On this shaft, 11, there are mounted two cam members, 18 and 19, which coöperate substantially as if they were one cam for actuating the pawl-and-ratchet device which actuates the driving shaft, 7, of the endless work-carrier belt. This movement is communicated from the cam members by means of a lever, 20, fulcrumed on a stud, 20ª, which projects from the standard a little below and in front of the bearings of the shaft, 11. The lever, 20, has the arm, 21, projecting forward from the fulcrum, having a laterally-positioned stud-and-roll abutment, 21ª, in the plane of the cam member, 19, against which the roll bears. The lever has another arm, 22, offset laterally from the main trend of the lever and at the opposite side of the fulcrum from the lever arm, 21, for the purpose of carrying the laterally-offset stud-and-roll abutment, 22ª, in the plane of the cam member, 18, against which the roll bears. The two cam members, 18 and 19, are reciprocally formed so that the movement of the lever which is compelled by the cam member operating against the abutment which bears upon it, is permitted and limited by the other cam member operating against the stud-and-roll abutment which bears upon it, and the two cam members are relatively formed so that in each revolution of the shaft, 11, the lever, 20, is rocked back and forth once, and is at all times held substantially without play or lost motion, being restrained in one direction by one cam member, and in the opposite direction by the other cam member. At the same side of the fulcrum of the lever at which the offset lever arm, 22, stands, the said lever has a third longer arm, 23, whose rear extremity is pivotally connected to a link or pitman, 24, which extends down along the back of the standard and through the bed frame, 1, to a point below the level of the upper ply of the chain, 2, and is connected to the left-hand end of a lever arm, 25, which extends from a collar, 26, mounted for rocking on the shaft, 7. On said shaft, immediately adjacent to said collar, there is fixedly mounted a ratchet wheel, 27, and on the lever arm, 25, there is pivoted a pawl, 28, which engages the teeth of the ratchet as the lever arm, 25, is operated by the link, 24, to rock the collar, 26, on the shaft, 7, The amplitude of the cam members, 18 and 19, is sufficient to give to the pawl, 28, an angular sweep, sufficiently in excess of the distance from tooth to tooth of the ratchet, to cause it to pick up a new tooth in each oscillation. In order to accurately position the work-holder dies at the end of each driving stroke of the pawl, 28, as well as for another purpose hereinafter specified, there is mounted rigidly upon the shaft 7, a scalloped wheel, 29, and on the frame there is pivoted at 31, a lever having an arm, 32, carrying a roll, 33, which bears upon the periphery of the scalloped wheel, and is adapted to fit in its scallops as they successively reach it in the rotation of the scalloped wheel with the shaft, 7.

It will be seen that any means operating to yieldingly hold the roller, 33, against the periphery of the wheel, 29, will cause that roller to operate with a tendency to draw the scalloped wheel to a position at which the roller seats at the bottom of the scallop after the crest of the scallop has been carried past the center of the wheel; and the device described, therefore operates with a tendency to complete each step movement of the endless work-carrier belt to cause it to halt with the dies properly alined with the working members, 15 and 16. In a sense, however, the function described of this device, comprising the scalloped wheel and the roller, 33, is incidental, its principal or primary purpose having a specific feature of the machine adapted for button making. This will now be described.

In the process of making buttons and button-backs, certain members of the button are deposited in the work-holder dies by the operator at the portion, A, of the path of travel of the upper ply of a belt which is exposed, as seen in Fig. 3. Upon the parts thus deposited, the working member, 15, operates when the die reaches the point of registration with that member. For completing the button a certain other element,— a disk, 39, of felt, leather or paste-board,— is to be deposited upon the work-holder die before it is exposed to the action of the working member, 16. In order to avoid the necessity of having the operator insert these parts in the work-holder die after it passes the working member, 15, the machine comprises means for depositing these parts automatically. For this purpose a receptacle, 30, for the disks is mounted at an elevated position above the parts heretofore described, said receptacle being up-held in such elevated position, partly by a discharge tube or spout, 31, which leads from the bottom thereof and terminates in a plate, 33, which is supported on the frame directly in front of the path of descent of the lower end of the working member, 16, for coöperation with the work-holder die below it. The receptacle, 30, is further held in position by means of a rock shaft, 34, which is journaled in a bearing, 35, supported by an up-standing arm, 36, of a bracket, 37, which is secured to the web, 10ᶜ, of a standard, 10. Within the receptacle, 30, this rock shaft carries a sweep, 38, which sweeps over the cylindrically-shaped bottom of the receptacle, 30, to cause the disks with which the receptacle is loaded, to be entered in piled order in the down-spout or discharge tube, 31, in which down-spout there thus comes to be a substantially continuous pile of these disks extending down to its discharge end, which is inclosed by an escapement device which will shortly be described. For rocking the shaft, 34, it has a lever arm, 34ᵃ, to which there is connected a link, 40, extended from the arm, 23, of the lever, 20, being connected thereto between the fulcrum and the connection of the pitman rod, 24, so that each time the lever is rocked by the cam members, 18, 19, the sweep is swung back and forth in the receptacle. A pile of disks being by this means maintained in the discharge tube or spout, 31, the bottom disk of the pile is lodged upon the escapement device which consists of a flat arm, 42, carried on the end of the lever arm, 32ᵃ, of the short vertical rock shaft, 31, which at its lower end has the horizontal arm, 32, carrying the roll, 33, which bears, as herein-above described, against the periphery of the scalloped wheel, 29. The arm, 42, is horizontally curved in the arc of a circle about the axis of the shaft, 31, so that its path, as the lever arm, 32, swings about said shaft, conforms to its outline. The end of this flat arm, 42, has a semi-circular notch, 42ᵃ, conformed substantially to the inner circumference of the tube, 31;—that is to say, to the circumference of the disks which are fed down through the tube. And the thickness of said arm is substantially, or very nearly the thickness of one of the disks to be delivered. The lower end of the tube, 30, stands above the upper face of the bed, which is flush with the upper face of the work-holding dies, only substantially as far as the thickness of the disks, so that, while the arm, 42, can move freely between the top of the work-holder die and the lower end of the tube, the clearance is very slight. With the construction described, it will be seen that upon each rocking of the shaft, 31, withdrawing the flat arm, 42, from under the end of the tube, 30, one of the disks will drop out of the end into the notch, 42ᵃ, upon the top of the bed at the level of the top of the work-holder die, and upon the next swing inward of the flat arm, 42, this disk will be thrust out from under the end of the tube and carries to a position directly above the work-holder die, where it will be in the path of descent of the working member, 16. A stop, 45, is mounted on the bed in position to cause the disk to be gripped between it and the notched end of the arm, 42, when the disk is directly above the work-holder-die. The parts are constructed and the connections related so as to cause this disk-delivering movement of the flat arm, 42, to occur during the travel of the work-holder die from the last preceding halt to the position of rest under the working member, 16, and to cause the said arm, 42, to commence to remain in position gripping the disk during the first descending movement of the working member, 16,—that is, until its lower end touches and grips the disk firmly.

Power is communicated to the machine by a driving belt over a pulley, 50, which is mounted loose on the shaft, 11, and clutched thereto by means of a sliding clutch member, 51, which engages an accompanying clutch member, 50ᵃ, on the hub of the wheel, 50, said clutch member, 51, being threaded for sliding on the shaft and operated for sliding into and out of clutch engagement by means of a shipping fork, 52, formed as one arm of a double bell crank lever, fulcrumed on a lug, 10ᵈ, projecting from the standard, 10, the other arms, 52ᵃ, 52ᵃ, having connected to their operating rods, 54, 54, which extend down to a pedal, not shown, by which the operator may move the clutch, 51, for engagement and disengagement.

It will be understood that the invention herein shown is not limited to any particular method or construction for connecting the work-holders in an endless series adapted to pass about carrying wheels and to be propelled in its endless path; and the word "chain" is employed in the specification and claims to denote such an endless flexible series, without regard to the means of flexibility.

For throwing the button out of the work-holder-die after it has passed the last of the reciprocating working members there is provided in the die, the plunger, 70, forming the bottom of the die cavity and having a spindle stem, 71, projecting from the bottom, or near side of the die, in position to encounter the driving sprocket wheel as the die forming part of the link of the chain passes onto the sprocket wheel between the sprockets. Encounter occurring, as can be most clearly seen in Fig. 5, from which it will be seen that said spindle extends between the two pivots of the link on which the work-holder-die is mounted to reach the bottom of the recess of the sprocket wheel between its sprockets. This encounter, it will be seen, will occur in respect to each die as the link of which it is a part, or by which it is carried, passes fully onto the sprocket wheel after having passed the last of said reciprocating working members. The button completed in the die is by this means thrust therefrom so as to be in position to fall as the chain passes down over the outer side of the sprocket wheel.

In Fig. 8 there is shown in detail a device which also appears in Fig. 1, for facilitating the delivery of the disks from the receptacle, 30, down through the discharge tube, 31. This device consists of a tapper, 60, for knocking against the pipe, 31, near its emergence from the receptacle, 30. This tapper is carried on the end of one arm, 61, of a bell-crank lever fulcrumed at its angle on the bearing of the shaft, 11, and having its other arm, 62, projecting toward the wheel, 50, and overhanging the left-hand margin of the clutch member, 51; and said clutch member has radially projecting pins, 63, distributed at intervals throughout its circumference in position to encounter said arm, 62, of the bell-crank lever as the clutch member revolves, and rock the bell-crank lever to withdraw the tapper, 60, from the pipe, 31. A spring, 64, attached to the bearing and to the bell-crank lever operates to retract the tapper with a blow against the pipe, 31, when the pins run off the end of the arm, 62.

The form of the cam members, 18, 19, necessary to cause them to give the desired movement to the pawl lever and other parts which they actuate, is such that the pressure of the stud-and-roll abutments on the arms of the lever, 20, as these abutments successively pass the crests or highest points of the cams, tends to rotate the shaft and thereby tends to hasten its movement faster than it would be driven by the clutch; that is, causes the driven clutch member, 51, on the hub of the wheel, 50, to run away from the driving clutch member, 50ª, on the wheel, 50, and to be immediately thereafter overtaken by said driving clutch member when the oppositely sloping portion of the cams reach the stud-and-roll abutments respectively. This tends to produce a hammering of the clutch member, making the machine very noisy and tending also to deteriorate the working parts. To prevent this hastening of the shaft and consequent hammering of the clutch members, I provide a brake operating upon the shaft to retard it against the hastening action of the abutments on the cam, as described. This brake is shown in detail in Fig. 9, consisting of the brake strap, 65, which encircles the shaft immediately adjacent to its bearing in the standard, 10, one end of the strap having a lug, 65ª, bolted to a lug, 9ᵈ, on the standard, and the other end being bent so as to terminate in a parallel lug, 65ᵇ, the lugs connected to each other by a bolt, 66, by which the strap may be drawn to any desired degree of tightness upon the shaft.

In Figs. 6 and 7, there is shown a modification of the cam device for operating the lever which has connections for actuating the step-by-step feed mechanism of the endless chain and the other devices which in the form already described derive movement from the lever, 20. In this modified form the cam device comprises a single member instead of the two members, 18 and 19, of the other form, and consists of a face cam, 80, having a face groove or channel, 81, for the stud-and-roll abutment, 82, of the arm, 83, of the lever, 84, which in this form takes the place of the lever, 20, in the first described form, and is fulcrumed on the stud, 20ª, as already described with respect to said other form. It will be observed that the outer guard wall of the cam groove, 81, in this form performs the function of the cam member, 18, in the first described form, and that the inner wall of said groove performs the function of the cam member, 19. The cam devices of the two forms and the respective lever arms with which they coöperate constitute substantial equivalents for the purpose of the movements communicated, differing from each other chiefly in respect to convenience of construction and adjustment for timing the movements, and with the difference in favor of the form shown in Figs. 6 and 7, that the pressure of the stud-and-roll abutment, 82, against the outer wall of the cam groove does not at any time operate so strongly to rotate the shaft as does the stud-and-roll abutment of the lever arm, 21, operating upon the cam member, 18. Even with this modified form of cam, however, I deem it preferable to retain the brake device shown in Fig. 9, to prevent the driven member of the clutch from running away from the driving member as above described.

I claim:—

1. In combination with a frame, comprising a flat table top having in its upper surface a longitudinal channel, an endless chain of work-holders mounted for traveling in said channel and having their upper work-receiving ends terminating substantially flush with the upper surface of the table top and completely occupying the mouth of the channel so as to leave no access thereto from said surface of the table, and means for impelling the endless chain in said channel.

2. In combination with a frame, comprising a flat table top having in its upper surface a longitudinal channel, an endless chain of work-holders mounted for traveling in said channel having their upper ends occupying the entire width of the channel so as to leave no access thereto below the top surface of said work holders and having their work-receiving mouths adapted to receive the work sliding on the table top surface to enter said mouths.

3. In combination with a frame, comprising a flat table top having in its upper surface a longitudinal channel and endless chain of work-holders mounted for traveling in said channel; a working member mounted for coöperation with said work-holders at an advanced point in the travel of the chain along the channel, said work-holders having their upper ends completely occupying the channel so as to leave no access thereto past said upper ends and having their work-receiving mouths positioned and adapted to receive the work, sliding on the table top surface to enter said mouths.

4. In combination with a frame, an endless chain of work-holders, carrying wheels for the chain; a working member and means for reciprocating it toward and from the path of the work holders; means for actuating the chain with alternating steps and halts timed to halt the chain at the latter part of the movement of the working member toward it; a work-material conduit terminating at a distance above the level of the top of the work holders substantially equal to the thickness of said material at one side of the path of the work holder; a support on the frame for lodgement of said work material substantially at the level of the top of the work holder; an escapement device and means for reciprocating it through the space between the discharge end of the conduit and said support timed to so reciprocate it during the retraction of the working member.

5. In combination with the frame, an endless chain of work holders, a driving sprocket wheel for the same; a shaft for said wheel; pawl-and-ratchet mechanism actuating said wheel; a scalloped wheel on said shaft having peripheral recesses at angular intervals equal to the step movement of the sprocket wheel; a support for working material level with the top of the work holders at one side of their path of travel; a pivoted arm and means for oscillating it over the top of said support, said means comprising an arm having a roller which bears upon the periphery of the scalloped wheel, and means for yieldingly pressing it thereagainst.

6. In combination with a frame, an endless chain of work holders, and carrying wheels for such chain mounted on the frame; a working member mounted for reciprocation toward and from the path of the work-holder chain; mechanism for propelling the chain with alternate steps and halts timed to halt the chain at the time of the movement of the working member toward the latter; plungers on the work holders, respectively, for ejecting the work therefrom, said plungers having stems extending through the work holders for encounter with one of the carrying wheels to cause such carrying wheel to force up the plunger to eject the work after the die has passed the coöperating work member.

7. In combination with a frame, a work holder and a working member coöperating therewith; means for giving movement to said coöperating parts to cause them to be registered with each other for their coöperation, comprising a cam device and a lever operated thereby; a rotating shaft to carry said cam device, and a friction brake operating on said shaft to restrain the movement of the shaft by pressure on the cam device of the part actuated thereby.

8. In combination with a frame, a work-holding die and a reciprocating head for carrying a working member to coöperate with the die; a rotating shaft and a cam thereon for actuating the reciprocating head in one direction; a spring to retract the reciprocating head, and a friction brake operating upon the shaft to restrain the rotation of the shaft under pressure upon the cam device caused by the spring.

9. In combination with a frame, an endless chain of work holders; a driving wheel for such chain; a shaft on which the driving wheel is mounted; means for rotating the shaft with step-by-step movement and rest intervals; a scalloped wheel on said shaft having alternate recesses and projections corresponding in their angular intervals with the step movement; an arm having a roller bearing upon the periphery of said wheel for engaging the recesses, and means for pressing it thereagainst as the wheel revolves.

10. In a machine for the purpose indicated, in combination with the work-holder chain and plungers coöperating therewith, an elevated receptacle for work pieces; a gravity conduit from said receptacle and means for positioning its lower end fixedly at one side of the path of the work holder at a distance above the level of the top thereof substantially equal to the thickness of the work pieces; a shaft which operates the plungers and work-holder chain; a lever fulcrumed proximate to the discharge conduit and adapted to be swung thereagainst; a spring for holding it yieldingly against the conduit, and a collar on said shaft having tappets which actuate the lever against the resistance of the spring.

In testimony whereof, I have hereunto set my hand at Chicago, Illinois, this 1st day of May, 1913.

JULIUS G. BREITENSTEIN.

Witnesses:
M. GERTRUDE ADY,
LUCY I. STONE.

Copies of this patent may be obtained for five cents each, by addressing the "Commissioner of Patents, Washington, D. C."